(12) United States Patent
Choi et al.

(10) Patent No.: US 10,698,659 B2
(45) Date of Patent: Jun. 30, 2020

(54) QUANTUM NOISE-BASED RANDOM NUMBER GENERATING APPARATUS UTILIZING A PLURALITY OF LIGHT SOURCES

(71) Applicant: ID QUANTIQUE S.A., Carouge (CH)

(72) Inventors: Jeong Woon Choi, Seoul (KR); Seok Beom Cho, Seoul (KR)

(73) Assignee: ID QUANTIQUE S.A., Carouge (CH)

( * ) Notice: Subject to any disclaimer, the term of this patent is extended or adjusted under 35 U.S.C. 154(b) by 0 days.

(21) Appl. No.: 15/571,337

(22) PCT Filed: Feb. 24, 2017

(86) PCT No.: PCT/KR2017/002063
§ 371 (c)(1),
(2) Date: Nov. 2, 2017

(87) PCT Pub. No.: WO2018/155738
PCT Pub. Date: Aug. 30, 2018

(65) Prior Publication Data
US 2019/0369965 A1    Dec. 5, 2019

(51) Int. Cl.
*G06F 7/58*    (2006.01)

(52) U.S. Cl.
CPC .................... *G06F 7/588* (2013.01)

(58) Field of Classification Search
CPC ............................................. G06F 7/58–588
USPC ............................................. 708/250–256
See application file for complete search history.

(56) References Cited

U.S. PATENT DOCUMENTS

| 7,409,161 B2 | 8/2008 | Watanabe | |
| 9,658,831 B2* | 5/2017 | Sartor | G06F 7/588 |
| 10,346,136 B2* | 7/2019 | Choi | G06F 7/588 |
| 2009/0219491 A1 | 9/2009 | Williams et al. | |
| 2015/0212798 A1* | 7/2015 | Choi | G06F 7/588 |
| | | | 708/255 |
| 2017/0010865 A1* | 1/2017 | Sanguinetti | H04L 9/0852 |
| 2017/0060534 A1* | 3/2017 | Sanguinetti | H04L 9/0852 |
| 2019/0212985 A1* | 7/2019 | Amri | G06F 7/58 |

FOREIGN PATENT DOCUMENTS

| KR | 10-2008-0111491 A | 12/2008 | |
| KR | 10-2014-0045235 A | 4/2014 | |
| KR | 10-2016-0134914 A | 11/2016 | |
| KR | 20170024327 A * | 3/2017 | ......... G06F 2207/58 |
| KR | 20180102472 A * | 9/2018 | ............. G06F 7/588 |

(Continued)

OTHER PUBLICATIONS

Nan Wu, Kun Wang, Haixing Hu, Fangmin Song, Xiangdong Li, "A novel quantum random number generation algorithm used by smartphone camera," Proc. SPIE 9500, Quantum Information and Computation XIII, 95001H (May 21, 2015); doi: 10.1117/12.2183338 (Year: 2015).*

(Continued)

*Primary Examiner* — Matthew D Sandifer
(74) *Attorney, Agent, or Firm* — Hauptman Ham, LLP

(57) ABSTRACT

The present disclosure discloses a random number generating apparatus capable of equalizing the spatial intensity distribution of light signals that are radiated from a light resource and are input to individual pixels.

11 Claims, 13 Drawing Sheets

(56) References Cited

FOREIGN PATENT DOCUMENTS

KR        20180108301 A  * 10/2018  ................ G01J 1/42
WO     WO-2018115804 A1 *  6/2018  ............. G06F 7/588

OTHER PUBLICATIONS

The International Search Report dated Nov. 22, 2017 for PCT/KR2017/002063, citing the above references.
Bruno Sanguinetti et al., "Quantum Random Number Generation on a Mobile Phone", Physical Review X, Sep. 29, 2014, vol. 4, Issue 3, Article 031056, American Physical Society, US.

* cited by examiner

QUANTUM NOISE-BASED RANDOM NUMBER GENERATING APPARATUS UTILIZING A PLURALITY OF LIGHT SOURCES

CROSS REFERENCE TO RELATED APPLICATION

This present application is a national stage filing under 35 U.S.C § 371 of PCT application number PCT/KR2017/002063 filed on Feb. 24, 2017. The disclosures of the above-listed applications are hereby incorporated by reference herein in their entirety.

BACKGROUND OF THE INVENTION

1. Field of the Invention

The present disclosure relates to a random number generating apparatus having a function of controlling the spatial intensity distribution of light signals to be uniform using a plurality of light sources, and more particularly to a random number generating apparatus capable of equalizing the spatial intensity distribution of light signals that are radiated from a light source and are input to individual pixels.

2. Description of the Prior Art

Random numbers are needed in various fields, such as those of security, scientific calculations, games, and lotteries. Currently, in most cases, pseudo-random numbers generated based on an algorithm are used instead of true random numbers.

However, since pseudo-random numbers have a specific pattern, the specific pattern of the pseudo-random numbers is highly likely to be detected by observing the bit string of the pseudo-random numbers generated for a long time, thus significantly damaging unpredictability, which is one of the basic properties of random numbers. In particular, the use of pseudo-random numbers in security fields, such as for cryptographic communication, entails a very serious problem of security vulnerability.

To solve the foregoing problem, various studies have been conducted to develop a true random number generator that generates true random numbers instead of pseudo-random numbers. A quantum random number generator that generates true random numbers using quantum phenomena is a technology of generating a random bit string using complete randomness existing in natural phenomena.

As one method for configuring a quantum random number generator, a method of using shot noise, which relates to uncertainty of photon numbers of a light source, may be considered. Uncertainty of photon numbers of the light source is caused from the particle nature of light.

In realizing a random number generating apparatus that generates random numbers based on shot noise (or quantum shot noise) with respect to photon numbers, which is one of the most fundamental sources of noise in a light source, a technology of using an image sensor (for example, a Complementary Metal-Oxide Semiconductor (CMOS) sensor or Charge-Coupled Device (CCD) sensor) generally used for a camera module has recently been introduced (see Journal: Physical Review X, 4, 031056 (2014)).

Generally, however, the time-average light intensity values of light signals input to individual pixels of the image sensor of the camera module are not uniform. Accordingly, a post-processing algorithm for reforming output values from the respective pixels is necessary to be complicated, thus causing difficulty in implementing a random number generating apparatus.

In detail, a shot noise (or quantum shot noise)-based random number generator uses light intensity values accumulated in individual pixels for a specified amount of time as random numbers, and randomness originates from the fluctuation of these light intensity values. Particularly, since the light intensity values accumulated in the individual pixels for the specified time have a Poisson distribution, the mean and the variance of light intensity values have a linearly proportional relationship. For this reason, the variance as a measure of fluctuation is determined by the mean, and randomness in each pixel ultimately depends on the mean of light intensity values. Therefore, in order for the individual pixels of the image sensor to have the same randomness, it is important to equalize the time-average light intensity values input to the individual pixels.

For reference, when the strength of light signals input to the image sensor is measured using the image sensor, each pixel outputs a signal corresponding to a value of an accumulated number of photons, input to the pixel, during a predetermined time. Here, the time-average light intensity value refers to the mean of output signals which is obtained by repeating the measurement of the strength of light signals for the predetermined time a sufficient number of times at different times.

That is, when an image sensor including a plurality of pixels is used, the distribution of time-average light intensity values input to the respective pixels corresponds to the spatial light intensity distribution of a light source, and it is preferable for the time-average light intensity values input to the respective pixels to be uniform in order to guarantee excellent randomness for all pixels.

Accordingly, the present disclosure proposes a method for equalizing the spatial intensity distribution of light input to an image sensor using a plurality of light sources. In detail, the present disclosure proposes a method for equalizing time-average light intensity values input to individual pixels of an image sensor by suitably symmetrically disposing a plurality of light sources.

SUMMARY OF THE INVENTION

The present disclosure has been made in order to solve the above-mentioned problems and an aspect of the present disclosure is to provide a random number generating apparatus capable of equalizing time-average light intensity values input to individual pixels of an image sensor using a plurality of light sources.

A random number generating apparatus according to one exemplary embodiment of the present disclosure includes: at least two light sources; a light detection unit configured to include at least one pixel to detect light signals that are radiated from the at least two light sources; and a random number generation unit configured to generate a random number using quantum noise of a light quantity detected by the pixel, wherein the at least two light sources may be symmetrically disposed with respect to the light detection unit in order to equalize time-average light intensity values of the light signals input to each pixel when the light signals radiated respectively from the at least two light sources merge to be input to the pixel.

Specifically, the at least two light sources may be symmetrically disposed with respect to the light detection unit at a minimum distance to equalize the time-average light intensity values of the light signals.

Specifically, when the at least two light sources are disposed on the substrate where the light detection unit is disposed, the at least two light sources may be disposed at the same distance from the light detection unit.

Specifically, disposed positions of the at least two light sources may be adjusted and current of at least one of the at least two light sources may be controlled in order to equalize the time-average light intensity values of the light signals.

Specifically, each of time-average light intensity values of the light signals radiated respectively from the at least two light sources may be determined by at least one distribution characteristic of the light sources, and a distance between light sources in a symmetrical relationship among the at least two light sources may also be determined based on the at least one distribution characteristic.

Specifically, when the distribution characteristic is a Gaussian distribution, the distance between the light sources in the symmetrical relationship may be double the standard deviation of the Gaussian distribution.

Specifically, the random number generating apparatus may further include a cover configured to reflect the light signals radiated from the at least two light sources.

Specifically, the random number generating apparatus may further include a light diffusion unit configured to diffuse the light signals in order to equalize the time-average light intensity values of the light signals.

A random number generating apparatus according to another exemplary embodiment of the present disclosure includes: at least one light source; a light detection unit configured to comprise at least one pixel to detect light signals radiated from the at least one light source; and a light diffusion unit configured to diffuse the light signals in order to equalize the time-average light intensity values of the light signals input to each pixel when the light signals radiated from the at least one light source are input to the pixel.

Specifically, the random number generating apparatus may further include a random number generation unit configured to generate a random number using quantum noise of a light quantity detected by the pixel.

Specifically, the light diffusion unit may have diffuse-reflective property and may be disposed between the at least one light source and the light detection unit.

Specifically, the at least one light source may be turned on/off respectively, and when a randomness in each pixel has a reference quality or higher by controlling some of the at least one light source to be turned on, other light sources may be controlled to be turned off.

Specifically, when the number of the light source is two or more, the two or more light sources may be symmetrically disposed with respect to the light detection unit in order to equalize time-average light intensity values of the light signals.

A random number generating apparatus according to still another exemplary embodiment of the present disclosure includes: at least two light sources; one or more light detection units configured to comprise at least one pixel to detect light signals that are radiated from the at least two light sources; and a random number generation unit configured to generate a random number using quantum noise of a light quantity detected by the pixel, wherein the at least two light sources may be symmetrically disposed with respect to the light detection units, or a light diffusion unit may be disposed between the at least two light sources and the light detection units, in order to equalize time-average light intensity values of the light signals input to each pixel when the light signals radiated respectively from the at least two light sources are input to the pixel.

Accordingly, a random number generating apparatus having a function of uniformly controlling the spatial intensity distribution of light signals using a plurality of light sources according to the present disclosure is capable of equalizing time-average light intensity values input to individual pixels of an image sensor.

DETAILED DESCRIPTION OF THE EXEMPLARY EMBODIMENTS

Figure 1:
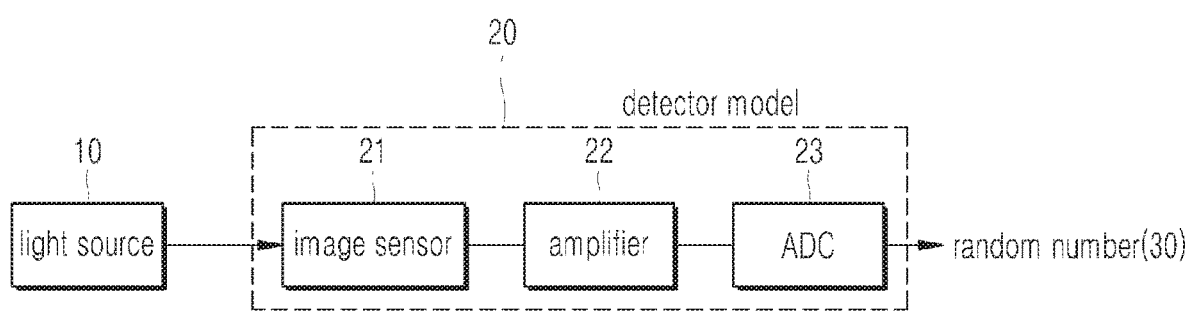
FIG. 1 illustrates the basic principles of configuring a random number generating apparatus.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

The present disclosure relates to a random number generating apparatus (hereinafter, "quantum random number generating apparatus") capable of equalizing the spatial intensity distribution of light signals that are radiated from a light source and are input to individual pixels.

The quantum random number generating apparatus uniformly detects a light quantity, which is the light intensity value of light signals that are radiated from a light source and are input to individual pixels during a predetermined time. Subsequently, the quantum random number generating apparatus generates true random numbers (hereinafter, "random numbers") based on shot noise (or quantum shot noise) with respect to the detected light quantity.

The quantum random number generating apparatus may be a quantum random number generator (QRNG). The quantum random number generating apparatus may be provided in equipment, module, and chip forms, without being limited thereto. Instead, the quantum random number generating apparatus may be provided in various forms.

The present disclosure relates to a hardware configuration for improving the performance of a quantum random number generating apparatus. In particular, the present disclosure relates to a quantum random number generating apparatus capable of optimizing the deployment of a light source and a component detecting a light signal (for example, an image sensor) so as to equalize the time-average light intensity values of light signals that are radiated from the light source and are input to individual pixels of the image sensor.

The present disclosure may include a hardware configuration to achieve miniaturization and mass production in a chip form in manufacturing a quantum random number generating apparatus. In particular, the present disclosure may include a method for disposing a light source in a chip when manufacturing a quantum random number generating apparatus.

Before describing the present disclosure in detail, a basic method of manufacturing a random number generating apparatus is briefly described with reference to FIGS. 1 to 3.

First, the basic principles of configuring a random number generating apparatus are described with reference to FIG. 1.

As illustrated in FIG. 1, the random number generating apparatus detects a light signal radiated from a light source 10 through a detection unit 20. The random number generating apparatus generates a random number 30 using shot noise (or quantum shot noise) with respect to the number of photons of a detected light quantity. A technology similar to FIG. 1 is mentioned in Physical Review X, 4, 031056 (2014).

The light source 10 radiates photons, for example, may successively radiate light signals including a plurality of photons.

The light source 10 may be a coherent light such as a laser, or a chaotic light such as a light-emitting diode (LED). When an LED is used as the light source 10, it is preferable to apply an optimal level of electric current within a set threshold range to the light source in order to maintain quantum noise properties.

The detection unit 20 may be, for example, a camera module having an image sensor 21 installed therein and may generate the random number 30 using quantum noise of the detected light quantity.

Here, the image sensor 21 includes a Complementary Metal-Oxide Semiconductor (CMOS) sensor, a Charge-Coupled Device (CCD) sensor, and the like. The image sensor 21 may include other sensors capable of detecting a light signal radiated from the light source.

The detection unit 20 amplifies an electric current/voltage accumulated per specified time in the image sensor 21 using an amplifier 22 and outputs a digital value through an Analog-Digital Converter (ADC) 23, in which the digitized output corresponds to the random number 30.

When the random number 30 is generated according to the basic principle of configuring the random number generating apparatus, light intensity values accumulated in individual pixels of the image sensor 21 during the specified time have a Poisson distribution, and thus the mean and the variance of light intensity values have a linearly proportional relationship. For this reason, the variance as a measure of fluctuation is determined by the mean, and randomness in each pixel ultimately depends on the mean of light intensity values. Therefore, in order for the individual pixels of the image sensor 21 to have the same randomness, it is important to equalize the time-average light intensity values input to the individual pixels.

That is, an output value from each pixel of the image sensor 21 corresponds to a light intensity input to each pixel. Accordingly, when the statistical characteristics of output values vary depending on the individual pixels, a post-processing algorithm for reforming the output values from the respective pixels needs to be complicated. Further, identical random numbers may be generated more frequently from a specified pixel than another pixel, so that it is difficult for all pixels to maintain good randomness.

Therefore, to reduce complexity in realizing the random number generating apparatus and to generate an excellent-quality random number from each pixel, it is crucial to equalize the time-average light intensity values of light signals that are radiated from the light source and are input to individual pixels, which causes a significant effect on the overall performance of the random number generating apparatus.

However, even though it is very important to equalize the time-average light intensity values of light signals input to the individual pixels of the image sensor, a method for merely simplifying a PCB configuration is generally proposed to overcome a hardware size limitation of the random number generating apparatus for miniaturization.

Hereinafter, methods to be considered in manufacturing a random number generating apparatus in a chip form according to the aforementioned basic principle of configuring the random number generating apparatus are described.

Figure 2:
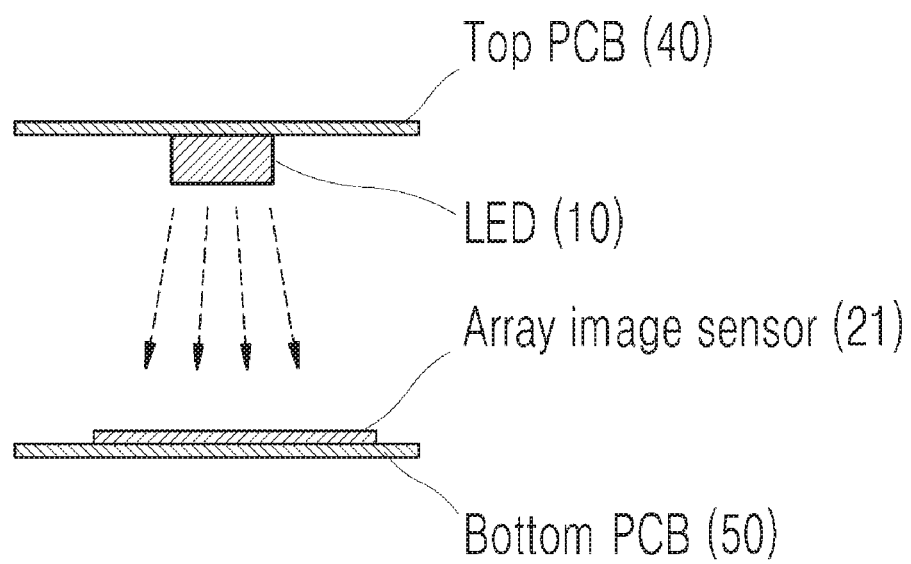
FIG. 2 illustrates a basic configuration method considered to manufacture a random number generating apparatus in a chip form.

According to a first configuration method to be considered in manufacturing a random number generating apparatus in a chip form, as illustrated in FIG. 2, a light source 10 and an image sensor 21 may be disposed to face each other.

To manufacture a random number generating apparatus according to the first configuration method, the random number generating apparatus needs to be configured such that light signals radiated from the light source 10 are diffused as widely as possible. Further, to allow as many as possible number of pixels in the image sensor 21 to detect similar light quantity values, it is needed to limit the distance between the light source 10 and the image sensor 21 or to limit the size of the image sensor 21.

Further, since it is necessary to separately use a top PCB 40 for disposing the light source 10 and a bottom PCB 50 for disposing the image sensor 21, a manufacturing process is complicated, making it difficult to achieve a cost reduction and miniaturization.

That is, the first configuration method makes it difficult to simplify a substrate configuration of the random number generating apparatus.

Figure 3:
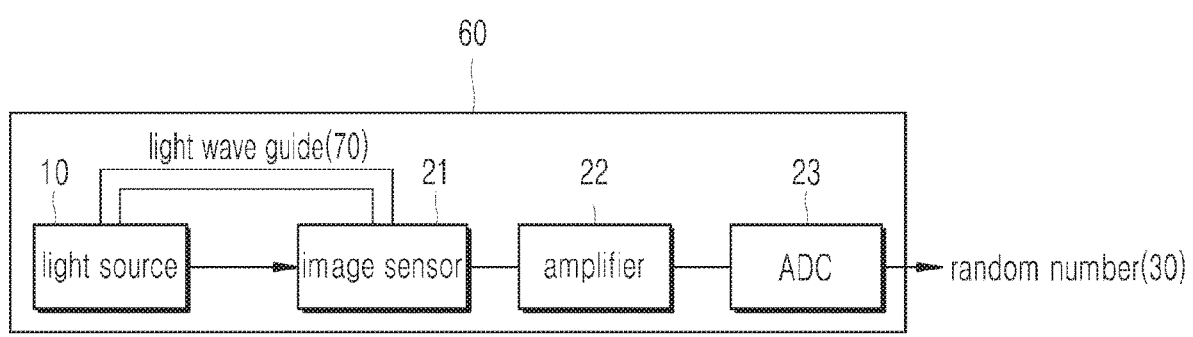
FIG. 3 illustrates another configuration method considered to manufacture a random number generating apparatus in a chip form.

According to a second configuration method to be considered in manufacturing a random number generating apparatus in a chip form according to the aforementioned basic principle of configuring the random number generating apparatus, the configuration illustrated in FIG. 3 may be considered, in which a light source 10 and an image sensor 21 are disposed on a single substrate 60 and a separate light wave guide 70 is added. A technology similar to FIG. 3 was introduced by the author of Physical Review X, 4, 031056 (2014) in QCrypt 2014.

However, the second configuration method of adding the light wave guide 70 has a complicated manufacturing process and results in a cost increase. Further, this method is expected to have a limitation in that it does not equalize the time-average light intensity values of light signals that are radiated from the light source 10 and are input to individual pixels of the image sensor.

Thus, the present disclosure proposes a hardware configuration capable of achieving the miniaturization and mass production of a quantum random number generating apparatus and equalizing the time-average light intensity values of light signals that are radiated from a light source and are input to individual pixels of an image sensor. In particular, as the quantum random number generating apparatus may be realized in a chip form, the present disclosure proposes a method of disposing a light source in a chip.

Hereinafter, the basic principles of a quantum random number generating apparatus that equalizes the time-average light intensity values of light signals which are radiated from a light source and are input to individual pixels according to an exemplary embodiment of the present disclosure are first described in detail with reference to FIGS. 4 to 6. Here, for convenience of description, it is assumed that the light source is an LED.

Figure 4:
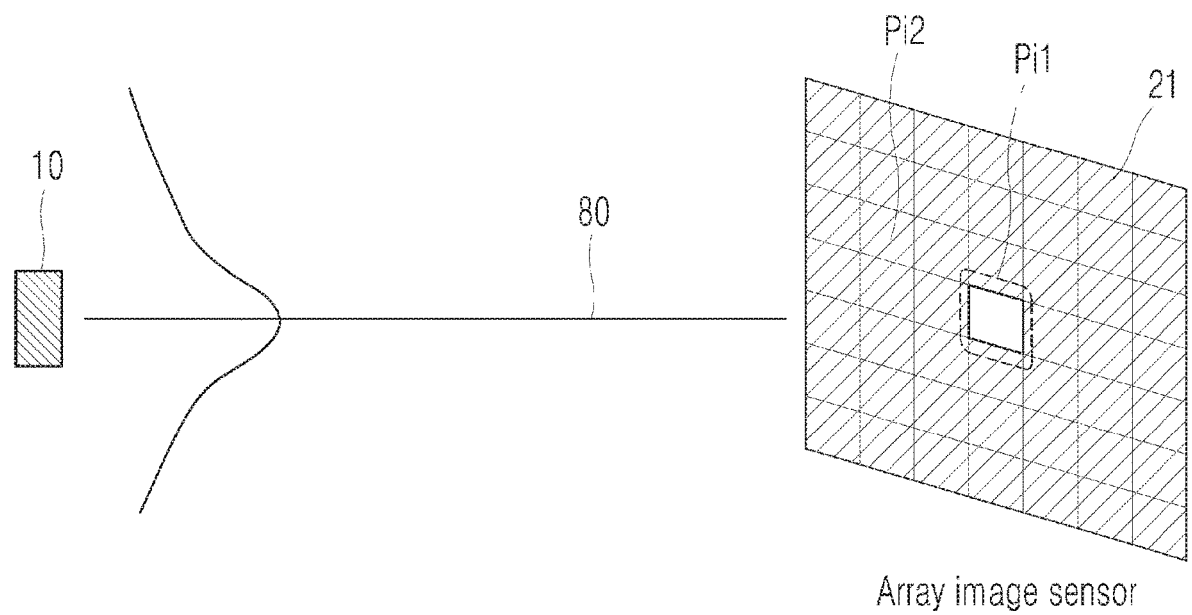
FIG. 4 illustrates an example in which a random number generating apparatus detects a light quantity.

In FIG. 4, a quantum random number generating apparatus is configured using one light source 10.

In configuring the quantum random number generating apparatus with one light source 10, when light signals are radiated from the light source 10, the time-average light intensity values input to individual pixels of an image sensor 21 are determined based on the spatial intensity distribution of the light signals radiated from the light source. Here, the spatial distribution of the time-average light intensity values input to the individual pixels disposed at spatially different positions varies significantly depending on the optical device processing method. The spatial distribution of the time-average light intensity values may be expressed as a Gaussian distribution sum, a cosine power sum, or the like. A related technology was mentioned in OPTICS EXPRESS, Vol. 16, No. 3, pp. 1808, February 2008. However, as the spatial distribution follows a Gaussian distribution having one peak in many cases, the following description is made with reference to the Gaussian distribution as an example.

On average, at least one pixel pi1 in the image sensor 21 positioned corresponding to a central axis 80 of the Gaussian distribution receives a maximum light quantity according to the Gaussian distribution on the central axis 80. That is, the greatest time-average light intensity value is input to the pixel pi1. However, pixels pi2 other than the pixel pi1 receive gradually decreasing light quantities as the distance from the central axis 80 increases, according to the Gaussian distribution, which symmetrically decreases with respect to the central axis 80.

Accordingly, the time-average light intensity values of the light signals input to the individual pixels of the image sensor 21 are different, and thus each pixel detects a different light quantity on average.

Thus, the quantum random number generating apparatus configured with one light source 10 has a problem in that it is unable to equalize the time-average light intensity values of the light signals input to the individual pixels pi1 and pi2 of the image sensor 21 since the time-average light intensity values of the light signals follows the Gaussian distribution.

Accordingly, various methods for configuring a quantum random number generating apparatus according to an exemplary embodiment of the present disclosure are proposed to equalize the time-average light intensity values of light signals that are radiated from a light source and are input to individual pixels.

First, a first method for configuring a quantum random number generating apparatus to equalize the time-average light intensity values of light signals input to individual pixels is described with reference to FIGS. 5 to 10.

Figure 5:
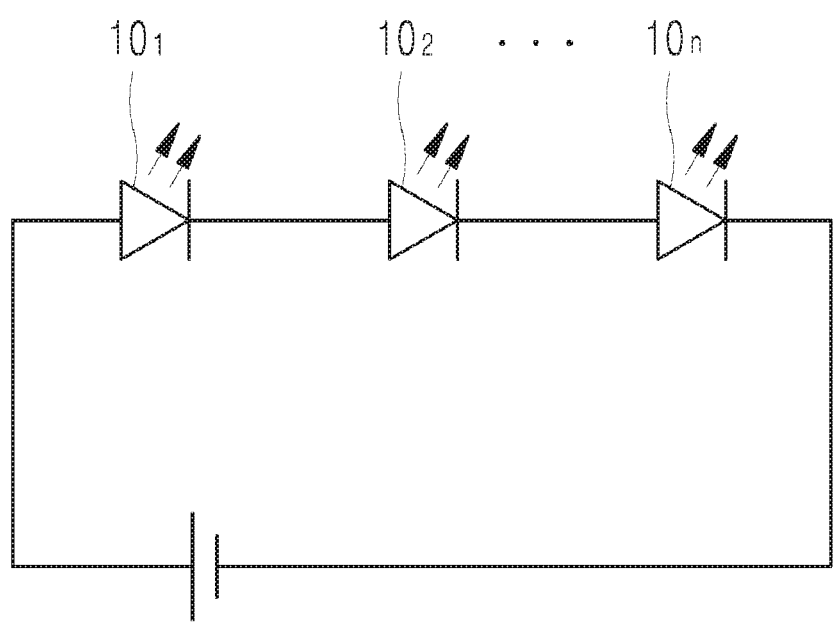
FIG. 5 is a circuit diagram illustrating a configuration of a plurality of light sources.

As illustrated in FIG. 5, the first method for configuring the quantum random number generating apparatus employs an LED, which is a p-n junction diode providing an electro-optic effect, as a light source and thus uses an LED characteristic of being easily extendable by connecting a plurality of light sources in series. Using this LED characteristic allows a plurality of light sources $10_1$ to $10_n$ to be simply connected in series without adding separate complicated circuitry. Accordingly, a quantum random number generating apparatus capable of equalizing the time-average light intensity values of light signals input to individual pixels due to the plurality of light sources $10_1$ to $10_n$ connected in series may be configured.

As compared with the existing method of adding a separate light wave guide to configure a quantum random number generating apparatus using one light source, this method may simplify a hardware structure, thus facilitating the miniaturization of a quantum random number generating apparatus in a chip form.

Figure 13:
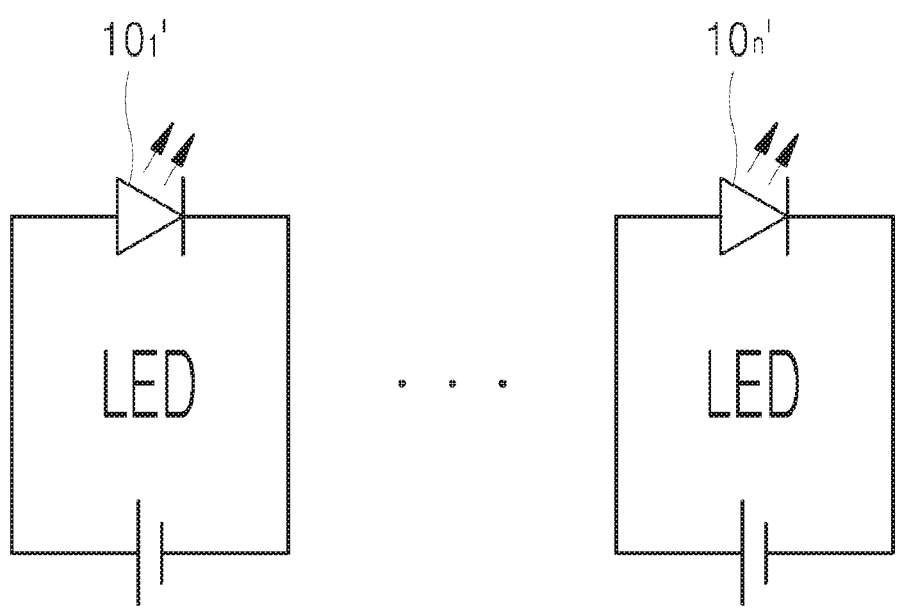
FIG. 13 illustrates a circuit configuration for independently controlling a plurality of light sources according to an exemplary embodiment of the present disclosure.

If necessary, as illustrated in FIG. 13, current applied to each LED may be independently controlled.

Figure 6:
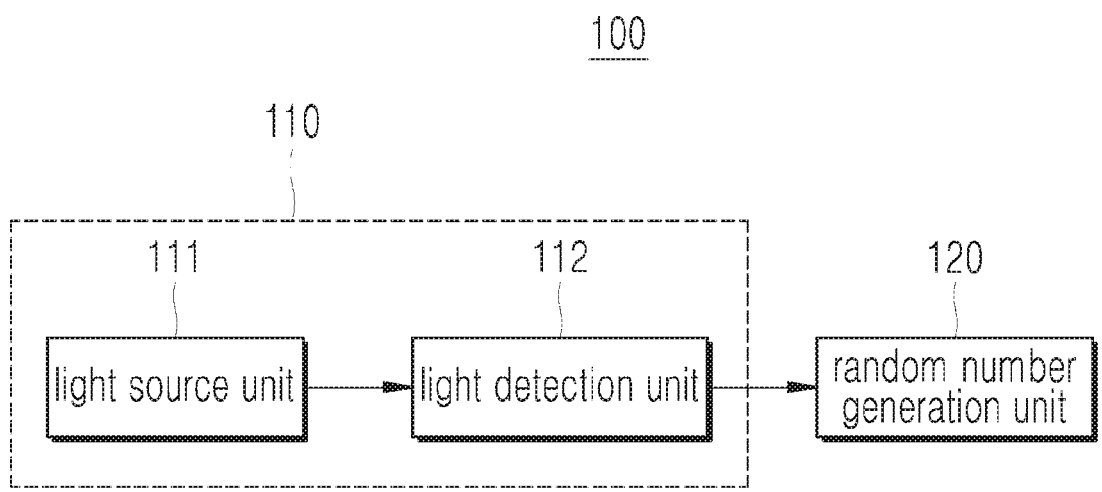
FIG. 6 illustrates a configuration of a random number generating apparatus formed based on a first configuration method according to an exemplary embodiment of the present disclosure.

As illustrated in FIG. 6, the quantum random number generating apparatus 100 configured with the foregoing LED characteristic according to the exemplary embodiment of the present disclosure includes a light source management unit 110 and a random number generation unit 120.

The light source management unit 110 includes a light source unit 111 including at least two light sources and a light detection unit 112 including at least one pixel to detect the time-average light intensity values of light signals which are radiated from the at least two light sources and merge into individual pixels. The light signals are radiated respectively from the at least two light sources and merged to be input to the pixel. Here, the at least two light sources are disposed such that the time-average light intensity values of light signals input to each pixel are uniform.

The random number generation unit 120 generates a random number using the light intensity values input to the pixel, that is, the quantum noise of a light quantity.

Figure 7:
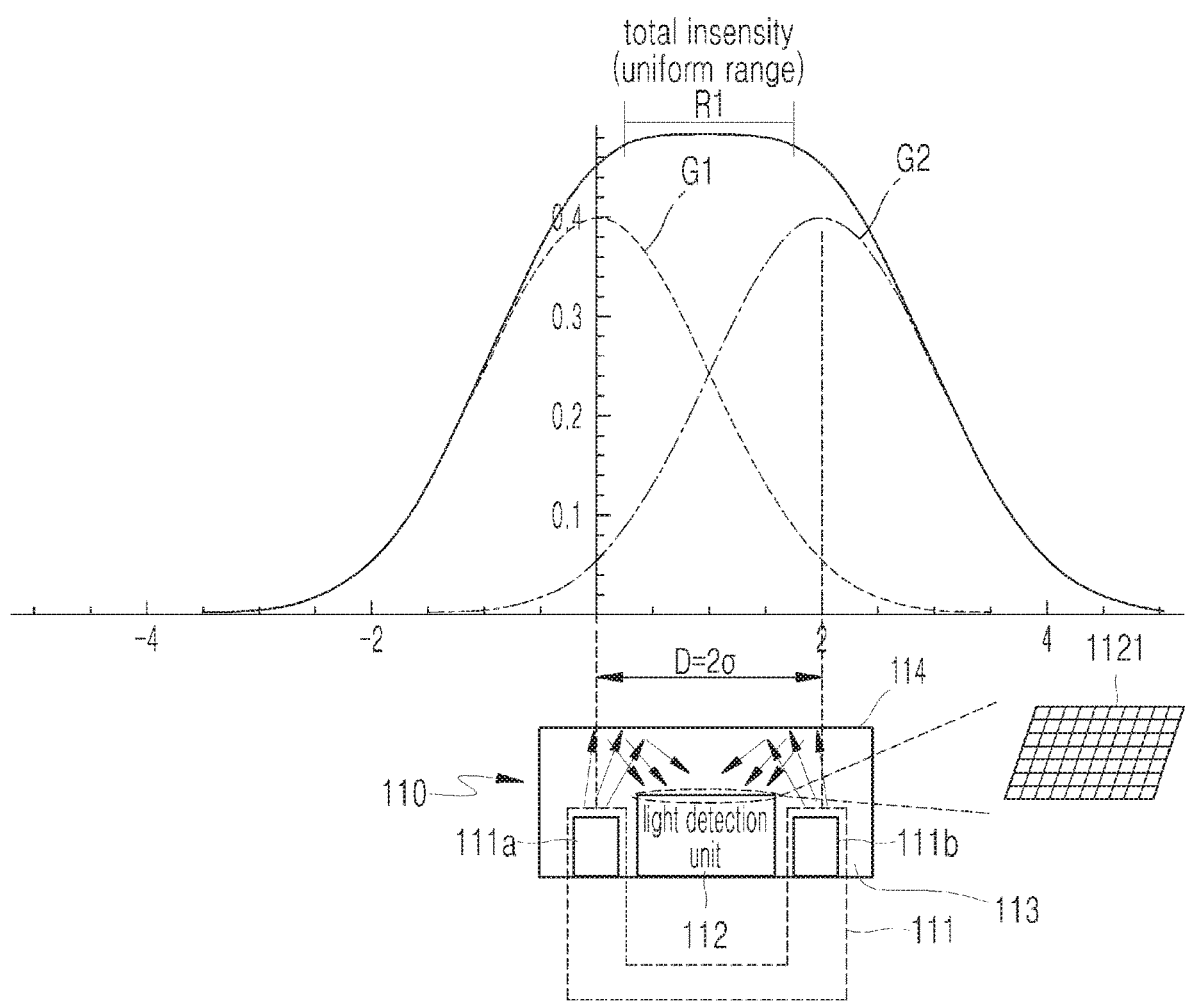
FIG. 7 illustrates an example of a layout structure of a random number generating apparatus and an example of a time-average light intensity distribution of light signals uniformly input to each pixel of an image sensor according to an exemplary embodiment of the present disclosure.

In detail, referring to FIG. 7, the light source unit 111 includes at least two light sources. Here, it is assumed that the light signals radiated from the at least two light sources are the same.

Here, the light source unit 111 may include a plurality of light sources (for example, two, three, four, or more light sources) symmetrically disposed depending on the size and performance of the quantum random number generating apparatus to be manufactured. Here, the number of light sources is not limited.

In the following description, two symmetrically disposed light sources 111a and 111b are illustrated for convenience of description.

The light detection unit 112 may be an image sensor, such as the CMOS and CCD sensors mentioned above, without being limited thereto.

The light detection unit 112 includes at least one pixel (for example, a pixel in the image sensor) 1121 to detect light signals radiated from the two light sources 111a and 111b.

Hereinafter, a layout structure of the light source management unit 110 for equalizing the time-average light intensity values of light signals input to the at least one pixel is described in detail with reference to FIG. 7.

As illustrated in FIG. 7, the light source unit 111 and the light detection unit 112 included in the light source management unit 110 are disposed on the same substrate 113.

When the quantum random number generating apparatus is manufactured in a chip form for miniaturization and mass production by disposing the light source unit 111 and the light detection unit 112 on a single substrate 113, light signals radiated from the light source unit 111 are necessarily reflected on a cover side 114 of a chip case.

In detail, the two light sources 111a and 111b are symmetrically disposed with respect to the light detection unit 112.

That is, when the two light sources 111a and 111b are disposed on the same substrate 113 where the light detection unit 112 is disposed, the two light sources 111a and 111b are symmetrically disposed at positions at the same distance from the light detection unit 112 so that the time-average light intensity values of light signals input to the pixel 1121 are equalized.

Although the embodiment of the present disclosure illustrates that the two light sources 111a and 111b are disposed at the same distance from the light detection unit 112, even when the two light sources 111a and 111b are disposed at different distances from the light detection unit 112, the time-average light intensity values of light signals input to the pixel 1121 may be equalized by controlling the amount of current applied to the light sources 111a and 111b.

Here, viewing the light signals from the position of the image sensor including the at least one pixel, the time-average light intensity values of the light signals respectively radiated from the two light sources 111a and 111b spatially follow the Gaussian distribution.

That is, the time-average light intensity values of light signals radiated from the light source 111a follow a first Gaussian distribution G1. The time-average light intensity values of light signals radiated from the light source 111b follow a second Gaussian distribution G2.

The entire distance D between the central axes of the light sources 111a and 111b symmetrically disposed with respect to the image sensor may be determined by the standard deviation σ, assuming that the first Gaussian distribution G1 and the second Gaussian distribution G2 have the same light intensity distribution characteristics. When the entire distance D is determined as a double the standard deviation, a uniform distribution range R1 may be obtained.

Here, when the two light sources 111a and 111b are disposed with respect to the light detection unit 112, as mentioned above, the distance between the light sources 111a and 111b and the light detection unit 112 may need to be minimized in order to minimize the size of the quantum random number generating apparatus. That is, it is required to find an optimal light intensity distribution to maintain the characteristics of the Poisson distribution. It may be achieved by adjusting the amount of current applied to each of the light sources 111a and 111b, so as to adjust the intensity of light radiated from each of the light sources 111a and 111b.

More specifically, the standard deviation may be adjusted by adjusting the light intensity, so that it possible to adjust the distance between the two light sources to be minimized.

Since light may be reflected on the cover side of the random number generator, the characteristics of the light intensity distribution do not exactly follow the Gaussian distribution. Also, the light sources do not exactly follow the Gaussian distribution (the Gaussian distribution sum, the cosine power sum, or the like). However, the characteristic whereby light intensity decreases as the distance from the light source increases is similarly maintained. In addition, in a case where distance between the light sources is minimized, the light intensity input to each pixel of the image sensor may be equalized by controlling the amount of current applied to the plurality of light sources to adjust the light intensity.

Hereinafter, a flow of generating a random number by equalizing the time-average light intensity values of light signals input to the at least one pixel in the light source management unit 110 is described in detail when the light source has the Gaussian distribution.

Figure 8:
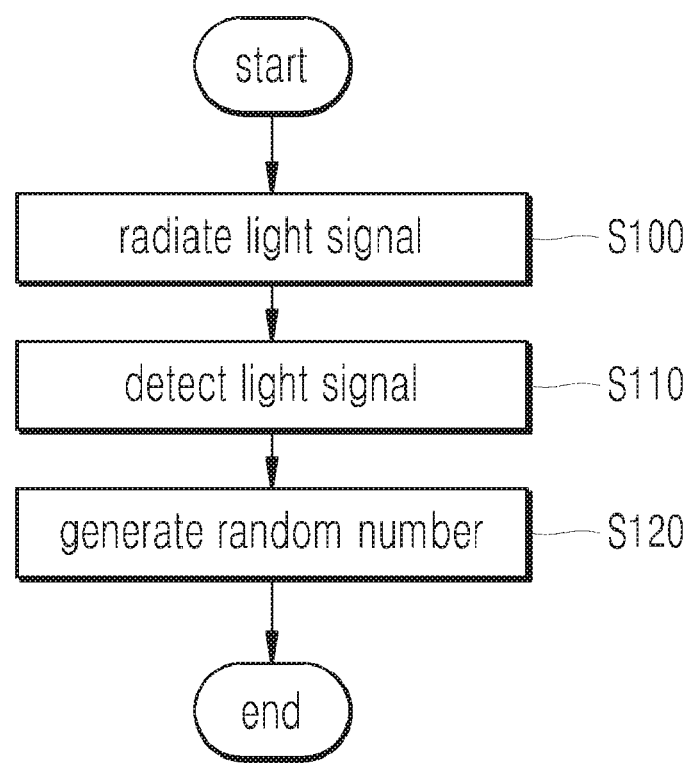
FIG. 8 is a flowchart illustrating that a random number generating apparatus generates a random number using the time-average light intensity values of light signals uniformly input to each pixel according to an exemplary embodiment of the present disclosure.

Referring to FIGS. 7 and 8, the at least one pixel 1121 detects light signals radiated from the at least two light sources (S100 and S110).

In detail, when the light sources 111a and 111b are symmetrically disposed with respect to the light detection unit 112 on the substrate 113, light signals radiated from the light source 111a are reflected on the cover side 114 and then the pixel 1121 receives the time-average light intensity values of the light signals corresponding to the first Gaussian distribution G1 formed within the entire distance D.

That is, the pixel positioned closest to the light source 111a among the pixels 1121 receives a highest time-average light intensity value. The other pixels receive gradually decreasing time-average light intensity values with an increase in the distance from the light source 111a corresponding to the first Gaussian distribution G1, which gradually decreases as the distance from the light source 111a increases.

Accordingly, when the light signals radiated from the light source 111a are reflected on the cover side 114, the pixel 1121 receives asymmetric time-average light intensity values of the light signals radiated from the light source 111a according to the first Gaussian distribution G1 formed in the entire distance D.

As described above, while the pixel 1121 is receiving the asymmetric time-average light intensity values of the light signals from the light source 111a, light signals are also radiated from the light source 111b and are reflected on the cover side 114. Accordingly, the pixel 1121 receives the time-average light intensity values of the light signals corresponding to the second Gaussian distribution G2 formed in the entire distance D at the same time.

That is, the pixel positioned closest to the light source 111b among the pixels 1121 receives the highest time-average light intensity value. The other pixels receive gradually decreasing time-average light intensity values with an increase in the distance from the light source 111b corresponding to the second Gaussian distribution G2, which gradually decreases as the distance from the light source 111b increases.

Thus, the at least one pixel 1121 asymmetrically receives the time-average light intensity values of the light signals radiated from the light source 111*a* according to the first Gaussian distribution G1, and at the same time asymmetrically receives the time-average light intensity values of the light signals radiated from the light source 111*b* according to the second Gaussian distribution G2. Accordingly, the light signals radiated from the light sources 111*a* and 111*b* merge to form the uniform distribution range R1. In the uniform distribution range R1, the Gaussian distributions of the time-average light intensity values of the light sources 111*a* and 111*b* is merged, so that asymmetry is compensated to each other. The pixel 1121 may receive a uniform light quantity in the uniform distribution range R1.

Here, in order to minimize the size of the quantum random number generating apparatus, an optimal light intensity distribution is determined to maintain the characteristics of the Poisson distribution by adjusting the amount of current applied to the light sources 111*a* and 111*b*. Based on the detected optimal light intensity distribution, the distance between the light sources 111*a* and 111*b* may be adjusted to be minimized.

As described above, the pixel 1121 is able to obtain a uniform light quantity and thus may maintain randomness using quantum noise in each pixel at the same level, thereby generating excellent-quality random numbers (S120).

Figure 9:
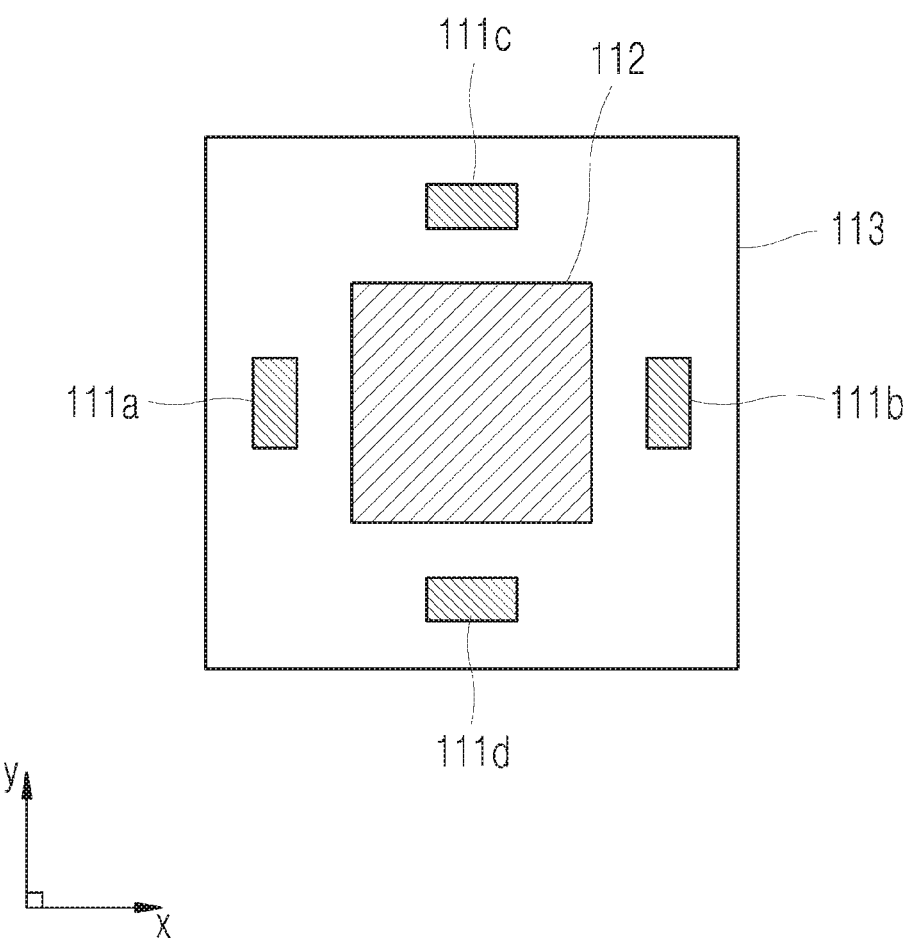
FIGS. 9 and 10 illustrate another example of a layout structure of a random number generating apparatus and another example of a time-average light intensity distribution of light signals uniformly input to each pixel of an image sensor according to an exemplary embodiment of the present disclosure.

The foregoing embodiment illustrates the quantum random number generating apparatus in which the two light sources are symmetrically disposed with respect to the light detection unit to equalize the spatial intensity distribution of light signals that are radiated from the light sources and are input to the individual pixels. Instead, as shown in FIG. 9, four light sources 111*a*, 111*b*, 111*c*, and 111*d* may be symmetrically disposed with respect to the light detection unit 112.

That is, the light sources 111*a* and 111*b* may be symmetrically disposed in a first direction x with respect to the light detection unit 112, and the light sources 111*c* and 111*d* may be symmetrically disposed in a second direction y with respect to the light detection unit 112. The second direction y is perpendicular to the first direction x.

Figure 10:
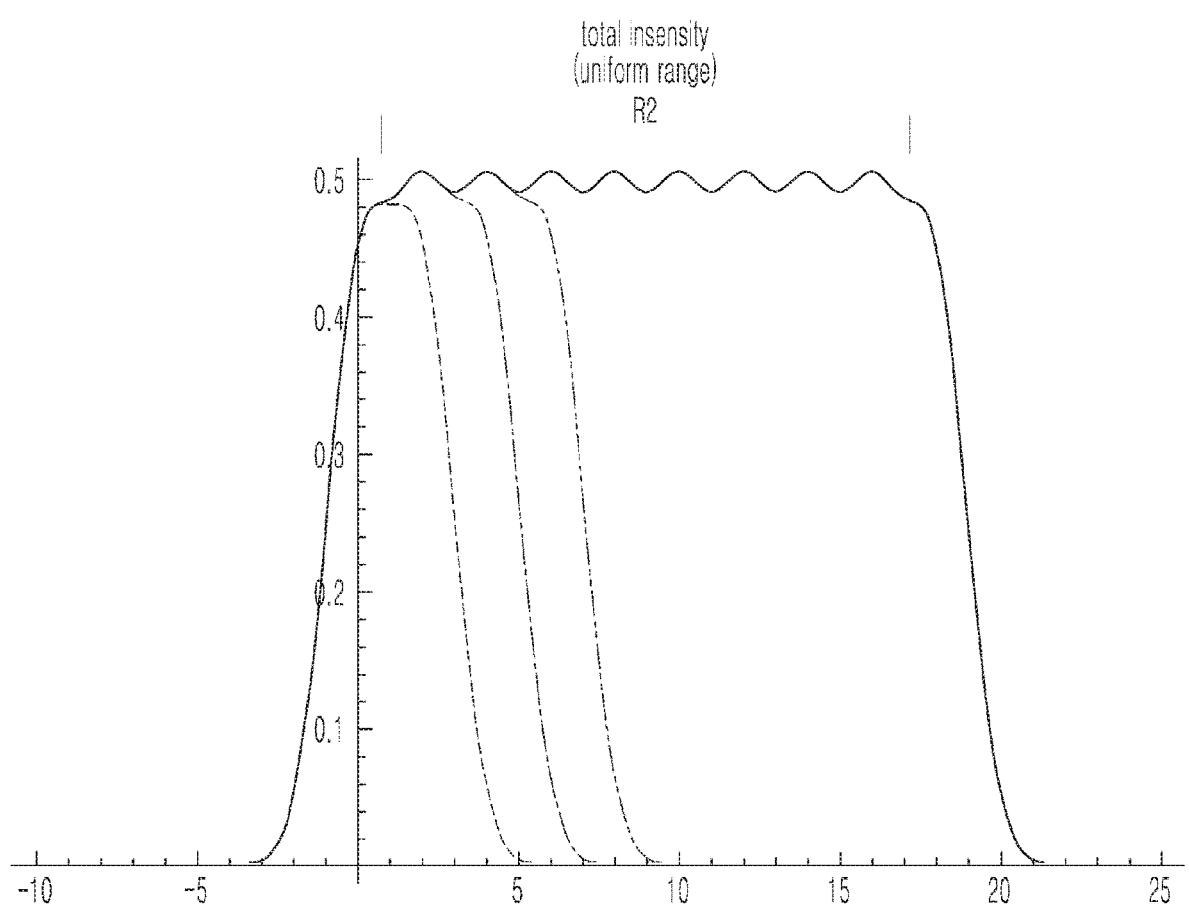

Further, when a plurality of light sources is disposed at a distance of double the standard deviation parallel to each side of the light detection unit 112, a certain scope of a uniform distribution range R2, in which light intensity is uniform, as illustrated in FIG. 10, may be obtained. More than four light sources may be used depending on the size and required performance of a quantum random number generating apparatus.

Although the embodiment of the present disclosure illustrates that the light detection unit 112 has four sides, the present disclosure is not limited thereto. Instead, when the light detection unit 112 is formed in a circle, light sources may be disposed to enclose the circle, thereby obtaining a certain scope of a uniform distribution range.

That is, when light sources are symmetrically disposed with respect to the light detection unit 112 regardless of the number of light sources, the at least one pixel 1121 may receive light signals with a uniform time-average light intensity value.

Although the embodiment of the present disclosure employs the Gaussian distribution as an example to equalize the spatial intensity distribution of light signals that are radiated from the light sources and are input to the individual pixels, the present disclosure is not limited thereto. Instead, the spatial intensity distribution of light signals that are radiated from the light sources and are input to the individual pixels may be equalized in a similar manner by using any distribution characteristics generated by the light sources.

Next, a second method for configuring a quantum random number generating apparatus to equalize the time-average light intensity values of light signals input to individual pixels is described with reference to FIGS. 11 to 13.

Particularly, the following description proposes a method for resolving the concentration of light intensity in a specified area due to various limitations occurring in implementing the quantum random number generating apparatus according to the embodiment of the present disclosure.

Specifically, the quantum random number generating apparatus basically employs at least one light source and is configured by further using various components, such as a reflection cover and a light detection unit. When the quantum random number generating apparatus is configured as a combination of different components, various limitations are imposed depending on the configuration environment.

That is, depending on the configuration environment of the quantum random number generating apparatus, various limitations are imposed, for example, a space for spreading the radiated light signal is narrow, pixels of the light detection unit have different sizes, the resolution of a pixel array varies, and the size (height) of the light detection unit varies.

Due to these limitations, light intensity input to a specified area of at least one pixel (for example, a pixel in the image sensor) of the light detection unit may relatively increases when the specified area is close to a light source. That is, the light intensity is concentrated in the specified area depending on the configuration environment of the quantum random number generating apparatus.

Therefore, the second method for configuring the quantum random number generating apparatus to solve this problem is described below in detail with reference to FIGS. 11 and 12.

Figure 11:
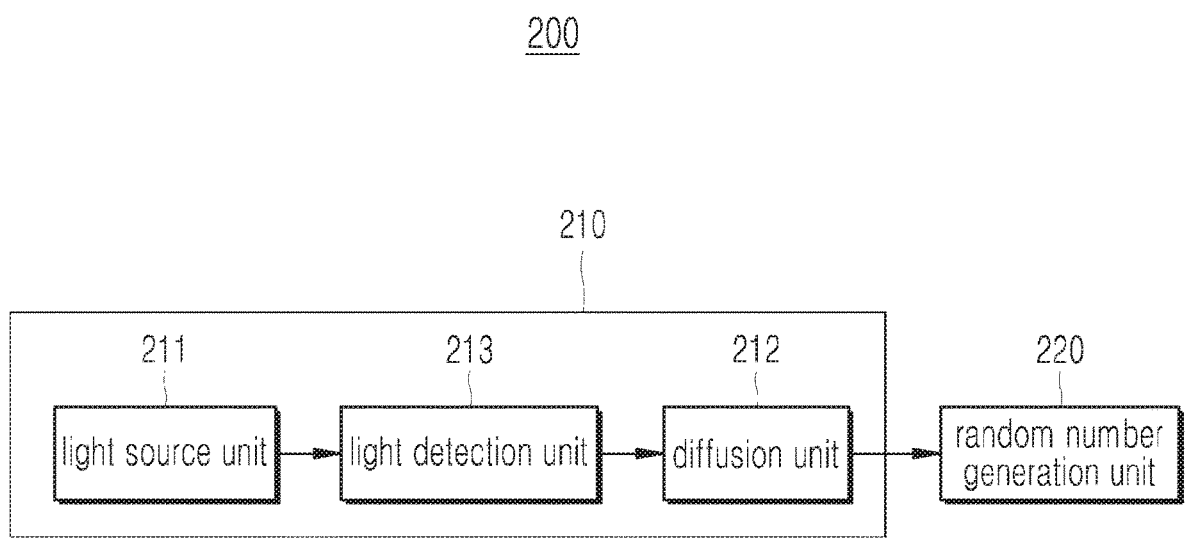
FIG. 11 illustrates a configuration of a random number generating apparatus formed based on a second configuration method according to an exemplary embodiment of the present disclosure.

As illustrated in FIG. 11, the quantum random number generating apparatus 200 includes a light source management unit 210 and a random number generation unit 220.

The light source management unit 210 includes a light source unit 211 including at least one light source, a light detection unit 212 including at least one pixel to detect a light signal radiated from the at least one light source, and a light diffusion unit 213 that spreads a light signal to equalize the time-average light intensity values of light signals input to each pixel when light signals radiated from the at least one light source are input to the pixel.

Figure 12:
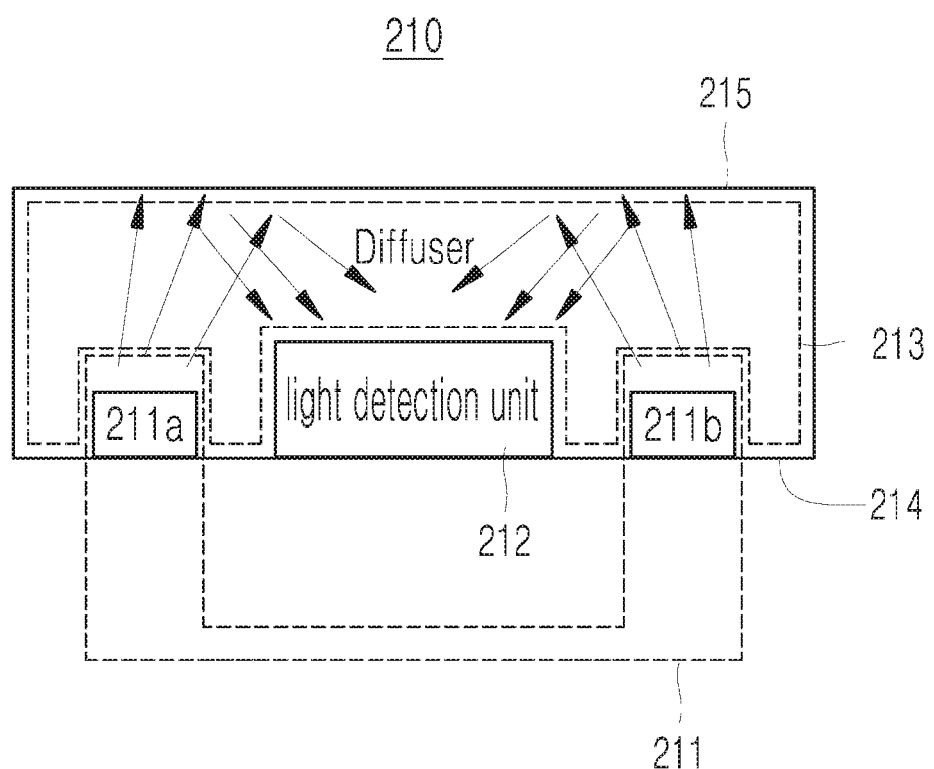
FIG. 12 illustrates still another example of a layout structure of a random number generating apparatus according to an exemplary embodiment of the present disclosure.

In detail, referring to FIG. 12, the light source unit 211 includes at least one light source. For convenience of description, it is assumed that two light sources 211*a* and 211*b* are symmetrically disposed with respect to the light detection unit 212.

The light detection unit 212 includes at least one pixel (for example, a pixel in the image sensor) to detect light signals radiated from the two light sources 211*a* and 211*b*.

The light source unit 211 and the light detection unit 212 are disposed on a single substrate 214 for the miniaturization and mass production of the quantum random number generating apparatus 200. When the quantum random number generating apparatus is manufactured in a chip form for miniaturization and mass production by disposing the light source unit 211 and the light detection unit 212 on a single substrate 214, light signals radiated from the light source unit 211 are necessarily reflected on a cover side 215 of a chip case.

However, as mentioned above, when the quantum random number generating apparatus is manufactured as a combination of various components, light intensity may be concentrated in a specified area by limitations imposed depending on the configuration environment. Accordingly, in the embodiment of the present disclosure, the quantum random number generating apparatus is configured by adding the light diffusion unit 213 capable of inducing diffused reflection in the light source management unit 210.

The light diffusion unit 213 is disposed between the light source unit 211 and the light detection unit 212. The light diffusion unit 213 has functions to induce diffused reflection while light signals radiated from the light source unit 211 spread to the light detection unit 212. That is, the light diffusion unit 213 serves to additionally deal with various limitations that occur when configuring the quantum random number generating apparatus.

The light diffusion unit 213 may include a light-diffusing material (diffuser, for example, acryl) having diffuse-reflective properties, and may, regardless of the form thereof (solid, gas, or liquid), be disposed in the light source management unit 210 in a manner suitable for the form thereof.

Therefore, when the light diffusion unit 213 is disposed between the light source unit 211 and the light detection unit 212, light may spread more widely and evenly, so that light intensity is not concentrated in a specified area, even in the occurrence of the aforementioned various limitations depending on the configuration environment. That is, the time-average light intensity values of light signals input to individual pixels may be equalized.

Referring back to FIG. 11, the random number generation unit 220 generates a random number using quantum noise of a light quantity, that is the light intensity values input to the at least one pixel.

In the aforementioned second method for configuring the quantum random number generating apparatus 200, the light diffusion unit 213 having diffuse-reflective properties is added between the light source unit 211 and the light detection unit 212 to equalize the light intensity input to the pixel in the light detection unit 212 regardless of the configuration environment. This additional component allows more options in determining the number and arrangement of light sources when configuring the quantum random number generating apparatus. In some cases, this additional component helps the quantum random number generating apparatus achieve excellent-quality randomness of a reference level or higher even with a single light source.

Further, in the first and second methods for configuring the quantum random number generating apparatus according to the embodiment of the present disclosure, as illustrated in FIG. 13, light sources $10_1'$ to $10_n'$ may be disposed in parallel so that at least one light source $10_1'$ to $10_n'$ may separately control the amount of current and on/off operations.

When the light sources $10_1'$ to $10_n'$ are configured to be able to independently control the amount of current and on/off operations, it is possible to use only some of the light sources $10_1'$ to $10_n'$. Using this, when the life of a currently used light resource ends or the quality of the light source deteriorates, a hardware design and a driving logic is implemented so that other alternative light sources can be used. In particular, when a light diffusion unit is included, as in the second method for configuring the quantum random number generating apparatus, it is highly likely to achieve excellent randomness even with a single light source.

For example, when randomness having a reference quality or higher is secured by using only a specified light source $10_1'$ among the light sources $10_1'$ to $10_n'$, current is controlled to be supplied only to the specified light source $10_1'$, among the light sources $10_1'$ to $10_n'$, and not to be applied to the other light sources $10_2'$ to $10_n'$, so that the other light sources $10_2'$ to $10_n'$ may be used as alternative spare light resources depending on other considerations.

That is, when it is possible for the randomness in each pixel to be a reference quality or higher by controlling some of the at least one light source to be turned on, the other light sources are controlled to be turned off, thereby continuously maintaining the quality of the quantum random number generating apparatus and extending the life of the quantum random number generating apparatus.

As described above, the time-average light intensity values of light signals that are radiated from a light source and are input to individual pixels are equalized to maintain randomness in each pixel at the same level.

Further, in configuring a quantum random number generating apparatus, a hardware configuration is simplified by symmetrically disposing light sources with respect to a light detection unit, without a complicated process of adding a separate circuit, thereby minimizing the size of the quantum random number generating apparatus.

In addition, the time-average light intensity values of light signals input to each pixel are equalized, thus reducing complexity in a post-processing algorithm for reforming output values from the pixel and maintaining excellent randomness of output values at the same level.

Meanwhile, the method described in connection with the provided embodiments or steps of algorithm or control function may be implemented either directly by hardware or in a form of program commands, which can be executed through various computer means, and may be then recorded in a computer-readable recording medium. The computer readable medium may include a program command, a data file, a data structure, and the like independently or in combination. The program command recorded in the medium may be things specially designed and configured for the present disclosure, or things that are well known to and can be used by those skilled in the computer software related art. Examples of the computer-readable recording medium include magnetic media such as hard disks, floppy disks and magnetic tapes, light media such as a Compact Disc Read-Only Memory (CD-ROM) and a Digital Versatile Disc (DVD), magneto-light media such as floppy disks, and hardware devices such as a Read-Only Memory (ROM), a Random Access Memory (RAM) and a flash memory, which are specially configured to store and perform program instructions. Examples of the program command include a machine language code generated by a compiler and a high-level language code executable by a computer through an interpreter and the like. The hardware device may be configured to operate as one or more software modules in order to perform operations of the present disclosure, and vice versa.

Although the present disclosure has been described in detail with reference to exemplary embodiments, the present disclosure is not limited thereto and it is apparent to those skilled in the art that various modifications and changes can be made thereto without departing from the scope of the present disclosure.

What is claimed is:

1. A random number generating apparatus comprising:
   at least two light sources;
   a light detection unit configured to comprise a pixel array to detect light signals that are radiated from the at least two light sources;

and a random number generator configured to generate a random number using quantum noise of a light quantity detected by each pixel of at least a portion of the pixel array, wherein the at least two light sources are symmetrically disposed with respect to the light detection unit, and wherein, when the light signals radiated respectively from the at least two light sources merge when input to the pixel array, time-average light intensity values of the light signals input to the each pixel are equal.

2. The random number generating apparatus of claim 1, wherein the at least two light sources are symmetrically disposed with respect to the light detection unit at a minimum distance to equalize the time-average light intensity values of the light signals.

3. The random number generating apparatus of claim 1, wherein when the at least two light sources are disposed on a substrate where the light detection unit is disposed, the at least two light sources are disposed at the same distance from the light detection unit.

4. The random number generating apparatus of claim 1, wherein disposed positions of the at least two light sources are adjusted and current of at least one of the at least two light sources is controlled such that the time-average light intensity values of the light signals input to the each pixel are equalized.

5. The random number generating apparatus of claim 1, wherein each of time-average light intensity values of the light signals radiated respectively from the at least two light sources follows at least one distribution characteristic of the at least two light sources, and a distance between at least two light sources in a symmetrical relationship among the at least two light sources is determined based on the at least one distribution characteristic.

6. The random number generating apparatus of claim 5, wherein when the distribution characteristic is a Gaussian distribution, the distance between the at least two light sources in the symmetrical relationship is double the standard deviation of the Gaussian distribution.

7. The random number generating apparatus of claim 1, further comprising a cover configured to reflect the light signals radiated from the at least two light sources.

8. The random number generating apparatus of claim 1, further comprising a light diffusion unit configured to diffuse the light signals.

9. A random number generating apparatus comprising:
at least two light sources;
a light detection unit configured to comprise a pixel array to detect light signals radiated from the at least two light sources;
a light diffusion unit configured to diffuse the light signals radiated from the at least two light sources; and
a random number generator configured to generate a random number using quantum noise of a light quantity detected by each pixel of at least a portion of the pixel array,
wherein the light diffusion unit is configured to diffuse the light signals when the light signals radiated from the at least two light sources input to the pixel array such that time-average light intensity values of the light signals input to the each pixel are equalized, and
wherein the at least two light sources are capable of controlling on/off operations thereof respectively, and when a randomness in the each pixel has a reference quality or higher by controlling one light source of the at least two light source to be turned on, the other light source of the at least two light source is controlled to be turned off.

10. The random number generating apparatus of claim 9, wherein the light diffusion unit has diffuse-reflective property and is disposed between the at least two light sources and the light detection unit.

11. The random number generating apparatus of claim 9, wherein the at least two light sources are symmetrically disposed with respect to the light detection unit.

* * * * *